(12) United States Patent
Block et al.

(10) Patent No.: US 7,343,137 B2
(45) Date of Patent: Mar. 11, 2008

(54) CIRCUIT, SWITCHING MODULE COMPRISING THE SAME, AND USE OF SAID SWITCHING MODULE

(75) Inventors: Christian Block, Stainz (AT); Holger Flühr, Graz (AT); Kurt Wiesbauer, Kalsdorf (AT); Johann Riedler, Deutschlandsberg (AT); Heinz Ragossnig, Gross St. Florian (AT); Heinz Florian, Bad Gams (AT); Günther Greier, Graz-St. Peter (AT)

(73) Assignee: Epcos AG, Munich (DE)

( * ) Notice: Subject to any disclaimer, the term of this patent is extended or adjusted under 35 U.S.C. 154(b) by 272 days.

(21) Appl. No.: 10/490,930

(22) PCT Filed: Sep. 27, 2002

(86) PCT No.: PCT/DE02/03664

§ 371 (c)(1),
(2), (4) Date: Oct. 22, 2004

(87) PCT Pub. No.: WO03/030383

PCT Pub. Date: Apr. 10, 2003

(65) Prior Publication Data

US 2005/0059358 A1 Mar. 17, 2005

(30) Foreign Application Priority Data

Sep. 28, 2001 (DE) .............................. 101 48 015
Jan. 16, 2002 (DE) .............................. 102 01 433

(51) Int. Cl.
*H04B 1/44* (2006.01)
(52) U.S. Cl. .................... 455/78; 455/199.1; 455/83; 455/552.1; 333/103; 333/132; 333/134; 218/84; 218/143

(58) Field of Classification Search ................ 455/78, 455/83, 552.1, 199.1; 324/537; 333/103, 333/104, 132, 134; 218/84
See application file for complete search history.

(56) References Cited

U.S. PATENT DOCUMENTS 3,587,017 A 6/1971 Kurusu (Continued)

FOREIGN PATENT DOCUMENTS

DE 31 35 515 6/1982

(Continued)

OTHER PUBLICATIONS

Benz et al., "Tabellenbuch Radio—und Fernsehtechnik Funkelektronik", XP002232831, Kieser-Verlag, Neusäss, p. 130, 135, 286 (1993).

(Continued)

*Primary Examiner*—Marceau Milord
(74) *Attorney, Agent, or Firm*—Fish & Richardson P.C.

(57) ABSTRACT

The invention relates to a circuit comprising an antenna input (1), a signal input (2) and a signal output (3), and a switching unit (4), wherein the antenna input (1) is connected to a first protection device (6) against electrostatic discharges, said first protection device (6) being a band-pass filter in a π-configuration. The advantage of the first protection device (6) is that it eliminates the need for a band-pass filter in the front end module, when used in a mobile telephone. Furthermore, the band-pass filter has a very good filtering characteristic, enabling ESD-related disturbances to be effectively suppressed. The invention also relates to a switching module and to the use of the same.

25 Claims, 2 Drawing Sheets

U.S. PATENT DOCUMENTS

| | | | |
|---|---|---|---|
| 3,728,731 A | 4/1973 | Choi et al. | |
| 3,968,411 A | 7/1976 | Mueller | |
| 4,399,557 A | 8/1983 | Muszkiewicz | |
| 4,525,863 A | 6/1985 | Stites | |
| 4,573,168 A | 2/1986 | Henze et al. | |
| 4,695,283 A | 9/1987 | Aldinger | |
| 4,739,436 A | 4/1988 | Stefani et al. | |
| 4,758,805 A | 7/1988 | Yamazaki et al. | |
| 4,783,846 A | 11/1988 | Wachob | |
| 4,999,595 A | 3/1991 | Azumi et al. | |
| 5,122,878 A * | 6/1992 | Heigl et al. | 348/731 |
| 5,179,731 A * | 1/1993 | Trankle et al. | 455/291 |
| 5,203,019 A * | 4/1993 | Rinderle | 455/67.13 |
| 5,321,573 A | 6/1994 | Person et al. | |
| 5,323,332 A * | 6/1994 | Smith et al. | 702/106 |
| 5,473,293 A | 12/1995 | Yoshikazu et al. | |
| 5,488,540 A | 1/1996 | Hatta | |
| 5,523,716 A | 6/1996 | Grebliunas et al. | |
| 5,576,920 A | 11/1996 | Kosuga et al. | |
| 5,583,734 A | 12/1996 | McMills et al. | |
| 5,625,894 A | 4/1997 | Jou | |
| 5,630,223 A | 5/1997 | Bahu et al. | |
| 5,675,468 A * | 10/1997 | Chang | 361/119 |
| 5,689,818 A | 11/1997 | Caglio et al. | |
| 5,742,896 A | 4/1998 | Bose et al. | |
| 5,815,804 A | 9/1998 | Newell et al. | |
| 5,903,421 A * | 5/1999 | Furutani et al. | 361/58 |
| 5,926,075 A * | 7/1999 | Hayashi | 333/101 |
| 5,982,253 A * | 11/1999 | Perrin et al. | 333/182 |
| 5,995,387 A * | 11/1999 | Takahashi et al. | 363/21.04 |
| 6,100,606 A * | 8/2000 | Nakahata et al. | 307/91 |
| 6,111,478 A * | 8/2000 | Furutani et al. | 333/174 |
| 6,114,848 A * | 9/2000 | Suto et al. | 324/158.1 |
| 6,243,247 B1 | 6/2001 | Akdag et al. | |
| 6,445,262 B1 * | 9/2002 | Tanaka et al. | 333/133 |
| 6,590,263 B2 | 7/2003 | Gossner | |
| 6,608,547 B1 | 8/2003 | Greier et al. | |
| 6,657,827 B1 | 12/2003 | Fukuda et al. | |
| 6,731,184 B1 * | 5/2004 | Muto et al. | 333/103 |
| 6,738,609 B1 * | 5/2004 | Clifford | 455/296 |
| 6,745,046 B1 | 6/2004 | Eckert et al. | |
| 6,795,714 B1 * | 9/2004 | Fickenscher et al. | 455/552.1 |
| 6,847,803 B1 * | 1/2005 | Rauhala et al. | 455/63.1 |
| 2001/0004767 A1 | 6/2001 | Gordon et al. | |
| 2001/0027091 A1 | 10/2001 | Kimishima | |
| 2002/0121668 A1 | 9/2002 | Gossner | |
| 2003/0104780 A1 | 6/2003 | Young | |
| 2004/0145849 A1 | 7/2004 | Chang et al. | |

FOREIGN PATENT DOCUMENTS

| | | |
|---|---|---|
| DE | 32 13 437 | 10/1983 |
| DE | 43 44 333 A1 | 7/1994 |
| DE | 689 25 166 | 6/1996 |
| DE | 196 08 219 | 9/1996 |
| DE | 199 19 368 A1 | 11/2000 |
| DE | 199 31 056 | 1/2001 |
| DE | 199 44 489 | 4/2001 |
| EP | 0 681 365 | 11/1995 |
| EP | 0 355 973 | 12/1995 |
| EP | 0 704 925 | 4/1996 |
| EP | 0 784 384 | 7/1997 |
| EP | 0 820 155 | 1/1998 |
| EP | 1 037 308 | 9/2000 |
| EP | 1 073 208 | 1/2001 |
| EP | 1 094 538 | 4/2001 |
| GB | 877040 | 9/1961 |
| GB | 2089173 | 6/1982 |
| GB | 2299892 | 10/1996 |
| JP | 62-098905 | 5/1987 |
| JP | 06112850 | 4/1995 |
| JP | 2001127663 | 5/2001 |
| RU | 502511 | 2/1976 |
| WO | WO 00/46931 | 8/2000 |
| WO | WO 00/57515 | 9/2000 |
| WO | WO 02/058239 | 7/2002 |

OTHER PUBLICATIONS

Gramegna, G. et al., "A Sub-1-dB NF ±2.3-kV ESD-Protected 900-MHz CMOS LNA", *IEEE Journal of Solid-State Circuits*, 36(7):1010-1017 (2001).

Steyaert, M.S.J. et al., "Low-Voltage Low-Power CMOS-RF Transceiver Design", *IEEE Transactions on Microwave Theory and Techniques*, 50(1):281-287 (2002).

Lucero, et al "Design of an LTCC Switch Diplexer Front-End Module for GSM/DCS/PCS Applications", IEEE Radio Frequency Integrated Circuits Symposium: 2001 213-216.

International Norm IEC 61000-4-2, Edition 1.2, Apr. 2001.

* cited by examiner

CIRCUIT, SWITCHING MODULE COMPRISING THE SAME, AND USE OF SAID SWITCHING MODULE

TECHNICAL FIELD

This patent application relates to a circuit array, which has an antenna input, a signal input and a signal output. In addition, the circuit array has a switch unit that optionally connects the antenna input with the signal input or the signal output.

BACKGROUND

Circuit arrays are used as multi-band front-end modules for mobile telephones. They are connected to the antenna of a mobile telephone at the antenna input. When the antenna comes into contact with an electrically-charged user, this can result in electrostatic discharge, also known under the name "electrostatic discharge (ESD)." These electrostatic discharges can create voltage peaks that are capable of destroying the circuit array. Thus, it may be necessary to equip circuit arrays with a device that protects against ESD.

Printed specification WO 00/57515 discloses circuit arrays that are equipped with a protective device against ESD. The protective device comprises an electric high-pass filter in which a capacitor is connected in series and an inductor is connected in parallel to the antenna input path.

The ESD protective device helps reduce the ESD impulse entering the circuit array directly through the antenna. In addition to the impulse entering the circuit array directly through the antenna, an electrostatic discharge can also generate a high voltage in the circuit array through ground coupling. This can occur, for example, because the control input normally used in a circuit is arranged either on the high voltage (high) or on a low voltage (low). In this case, the high voltage (high) is defined, for example, by the fact that it lies 2.3 V above the ground voltage of the circuit array. Because, in the case of a mobile telephone, as with many other devices based on signal transmission via antennas, the signal input runs from the antenna to the system's ground, an electrostatic discharge can also directly affect the ground voltage of the circuit array in a circuit array of the type mentioned above. As a result of directly coupling a control line to ground through the "high" condition, the voltage impulse resulting from an electrostatic discharge can not only affect the path, via the antenna, but also the circuit array, via the control line.

A high-pass filter allows all frequency components of a signal, beginning with a certain cutoff frequency, to pass through it virtually unimpeded. In general, however, only a very narrow frequency range is relevant to the further processing of the signal received by the antenna in the mobile telephone. For example, frequencies of between 1 and 2 GHz are used in mobile telephones based on the GSM, PCN or PCS standard. All other frequencies received by the antenna tend to be interfering and, therefore, must be filtered out.

SUMMARY

A circuit array is described which contains a switch unit with an antenna input, a signal input and a signal output. The switch unit is suitable for electrically connecting the antenna input with either the signal input or the signal output. In addition, a control line that controls the switch position in the switch unit can be arranged at the switch unit. Additionally, the antenna input is connected to a first protective device against electrostatic discharges.

The first protective device against electrostatic discharges is a band-pass filter in a $\pi$ configuration.

The advantage of a band-pass filter is that it has a high insertion loss below a first cutoff frequency and above a second cutoff frequency. As a result, frequencies can be effectively suppressed, especially low frequencies that contain the bulk of electrical output of the impulses generated by electrostatic discharge. By arranging a band-pass filter at the antenna input, at least the need for subsequent filters in the reception paths can be loosened, which results in a generally improved insertion loss.

In an embodiment, the first protective device has an antenna input and a switch output, which are connected to one another by a line. A series circuit comprising a capacitor and an inductor is connected in series to the line. Between the antenna input and the series circuit, a first parallel circuit of a capacitor and an inductor is connected in parallel to the line and connected to a ground. Between the switch output and the series circuit, a second parallel circuit comprising a capacitor and an inductor is connected in parallel to the line and connected to a ground.

A band-pass filter in a $\pi$ configuration is achieved with the circuit array of the protective device described above.

In another embodiment, a capacitor can be connected in series between the switch output and the second parallel circuit. As a result, a direct current suppression is achieved that prevents DC voltage applied to the switch unit from being short-circuited against the ground.

In addition, a capacitor can also be connected in series to the line between the antenna input and the first parallel circuit.

To use the circuit array in a mobile telephone in which frequencies based on the GSM or PCS standard are used, it is advantageous for the band-pass filter to have an attenuation less than 0.5 dB between 1 and 2 GHz. Outside this frequency range, the band-pass filter should have the highest possible attenuation (e.g. >20 dB at f>3.4 GHz).

The circuit array, together with the band-pass filter, is also advantageous in that, as a result of the two capacitors connected in series to the line, a DC voltage block is achieved that prevents DC voltage applied to the switch unit from being discharged to the ground. This effectively reduces the risk of a short circuit.

In an embodiment, the control line is also connected to a second protective device against electrostatic discharges. The advantage of this arrangement is that ESD interference penetrating into the circuit can be effectively prevented through ground coupling via the control line.

The protective devices against electrostatic discharges are connected to a ground connection, into which the excess voltage from the electrostatic discharges can be discharged.

The switch unit can, for example, be a voltage-controlled switch, such as the type normally used in mobile telephone because of its low power consumption. In particular, a gallium-arsenide switch can be used as the switch unit.

The switch unit can also have multiple signal inputs and outputs. Accordingly, multiple control lines are needed.

The circuit array can also be provided with a decoder, which can be used to reduce the number of control lines. A decoder normally requires a power supply, which is connected via a supply line. The ESD protection of such a circuit can be improved even further by connecting the supply line to a third protective device against electrostatic discharges.

The decoder can also be designed so that the voltages of the control lines are generated from the voltage of the supply line. This can be accomplished by "pull-up resistors," for example. Then ESD protection can be simplified by providing only the power supply line with a second protective device. In this case, protection of the control lines is provided through the protection of the power supply.

The circuit array can also contain frequency filters that are assigned to individual signal inputs or signal outputs. They are suitable for filtering the frequencies received by the antenna on a mobile telephone in such a way that the signals conducted and filtered through the signal output can be processed further by the mobile telephone. The same applies to the signal inputs of the circuit array, which, in a mobile telephone, are used to transmit the voice signals generated in the mobile telephone to a receiver via the antenna.

The use of a voltage-limiting element, which is connected in parallel to the control line and is also connected to the ground potential, represents another option for a second protective device against electrostatic discharges. A voltage-limiting element can be a varistor, for example. Such a varistor has very low resistance beginning at a certain cutoff voltage, so that excess voltage against ground can be diverted. Varistors with low switching voltage are suitable, because this minimizes the residual voltage that occurs in a voltage impulse and loads the circuit array. For this reason, it is advisable to use varistors with a varistor voltage of between 4 and 20 V. Accordingly, the terminal voltage in a voltage impulse that loads the circuit array is about 8 to about 50 V. As a result, the circuit array can be reliably protected against destruction in the event of an ESD impulse.

Another possibility is to use a switch spark gap or a Z-diode as a second protective device against electrostatic discharges.

Also described is a circuit array in which the antenna input is connected to an antenna, in which the signal output is connected to a receiving amplifier of a mobile telephone, and in which the signal input is connected to a transmission amplifier of a mobile telephone.

In addition, a circuit module is specified which contains a circuit array. The circuit module also contains a multilayer ceramic substrate with integrated passive components, which form electric frequency filters. These frequency filters are assigned to the signal inputs and/or outputs. The switch unit, which can, for example, be executed with the aid of PIN diodes or in the form of a gallium-arsenide switch, is arranged on the upper side of the multilayer ceramic substrate. In addition, the first and, if applicable, second protective device against electrostatic discharges is integrated into the circuit module.

An advantage of the circuit module is that, as a result of the integration of the passive components into the ceramic substrate, as well as the integration of the protective device into the circuit module, a high degree of integration is achieved, which affects the space requirements of the circuit module. The integration of the first and, if applicable, second protective device into the circuit module can occur, for example, by mounting these components onto the surface of the ceramic substrate, adjacent to the switch unit.

In particular, it is also advantageous to use the circuit module as a front-end module in a mobile telephone.

In the following, embodiments are explained in greater detail with reference to corresponding diagrams.

DESCRIPTION OF THE DRAWINGS

The same reference symbols refer to the same elements in all diagrams.

DETAILED DESCRIPTION

Figure 1:
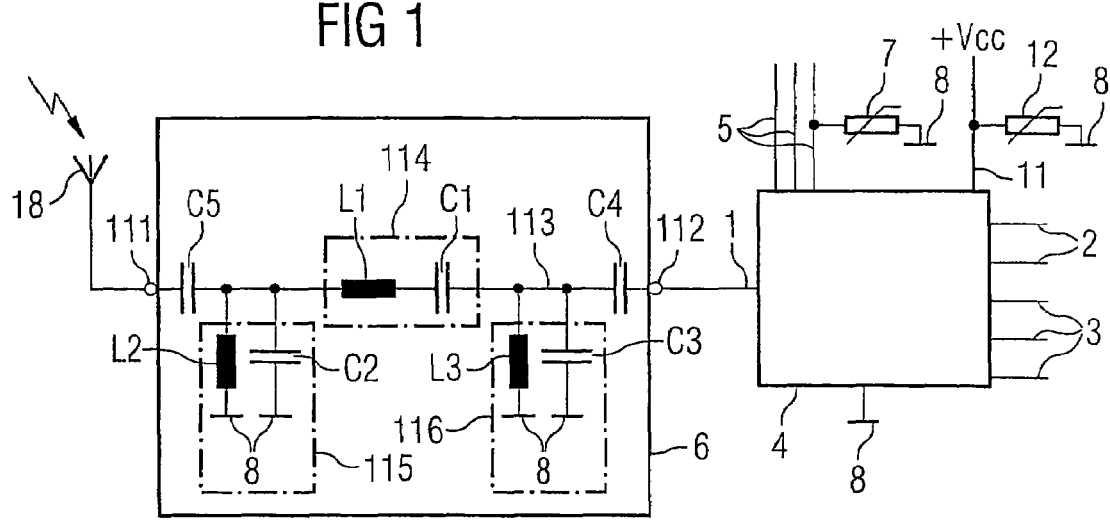
FIG. 1 shows, as an example, a circuit array in a basic circuit diagram.

FIG. 1 shows a circuit array with a switch unit 4, which is provided with a ground 8. The switch unit 4 has an antenna input 1, which is connected to an antenna 18. The antenna input 1 is connected to a first protective device 6 against electrostatic discharges (indicated by the lighting symbol in FIG. 1). The switch unit 4 contains at least one control line 5, which controls the switching process for connecting the antenna input 1 with the signal inputs 2 or the signal outputs 3 of the switch unit 4. Three control lines 5 are shown in FIG. 1. At least one of these control lines is provided with a second protective device 7 against electrostatic discharges. These second protective device 7 is executed in the form of a varistor, which is connected to the ground 18.

The switch unit 4 depicted in FIG. 1 also has a decoder, for which a supply line 11 is required. The supply line 11 is connected to a supply voltage+Vcc. In addition, the supply line 11 is connected to a third protective device 12 against electrostatic discharges. The third protective device 12 can, for example, be a varistor that is connected to the ground 8.

The first protective device 6 is implemented as a band-pass filter in a π configuration. Specifically, it can be implemented as follows: the first protective device 6 has an antenna input 111 and a switch output 112. The antenna input 111 and the switch output 112 are connected to one another by a line 113. A series circuit 114 comprising a capacitor C1 and an inductor L1 is connected in series to the line 113. Between the antenna input 111 and the series circuit 114, a parallel circuit 115 comprising a capacitor C2 and an inductor L2 is connected in parallel to the line 113, as well as to the ground 8. Between the switch output 112 and the series circuit 114, a parallel circuit 116 comprising a capacitor C3 and an inductor L3 is also connected in parallel to the line 113, as well as to the ground 8. Another capacitor C4, which acts as a DC current suppressor, is connected between the parallel circuit 116 and the switch output 112. Another capacitor C5 is also connected in series to the line 113 between the antenna input 111 and the parallel circuit 115.

Such a filter can have the following component data:
L1=from 0.1 to 22 nH
L2=from 0.1 to 22 nH
L3=from 0.1 to 22 nH
C1=from 0.1 to 18 pF
C2=from 0.1 to 18 pF
C3=from 0.1 to 18 pF The capacitors C3 and/or C2 can also be replaced with a protective element, such as a varistor. Individual or multiple combinations LiCi can also be formed by transmission lines that are coupled together.

Figure 2:
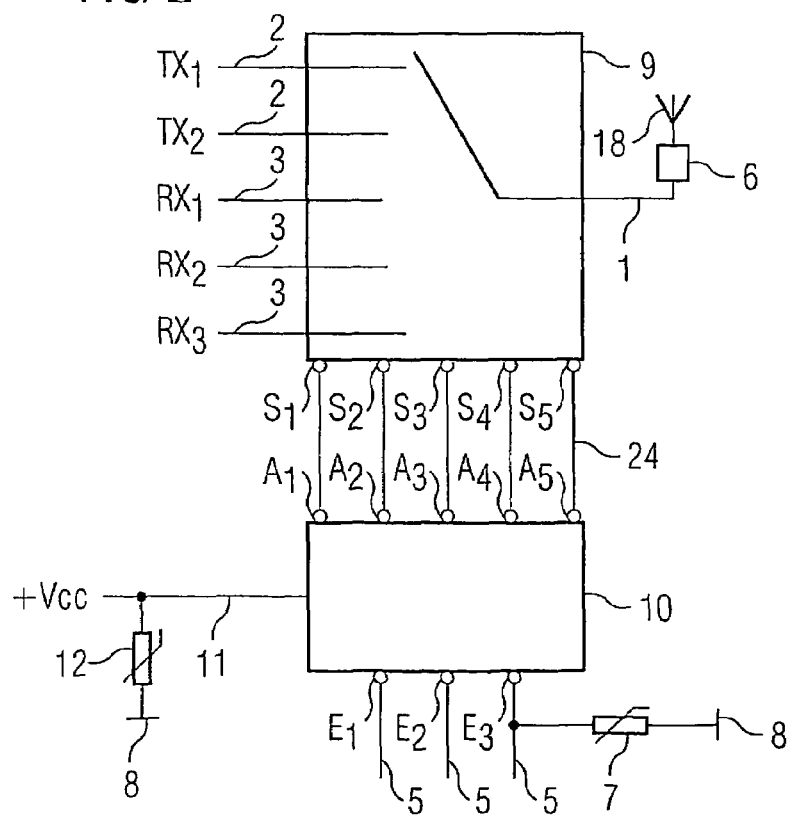
FIG. 2 shows, as an example, another circuit array in a basic circuit diagram.

FIG. 2 shows a voltage-controlled GaAs switch 9 with an antenna input 1, to which the antenna 18 is connected. The GaAs switch 9 has transmitter inputs $TX_1$, $TX_2$, and receiver inputs $RX_1$, $RX_2$, and $RX_3$. The GaAs switch 9 is controlled through control inputs $S_1$, $S_2$, $S_3$, $S_4$, and $S_5$. Control takes place in that exactly one of the control inputs $S_1$, $S_2$, $S_3$, $S_4$, and $S_5$ is set to "high," while the remaining control inputs are set to "low." The number of inputs needed can be reduced using the decoder 10 connected to the GaAs switch 9. The decoder 10 can be a 1-decoder or a 5-decoder, for example. It has control inputs $E_1$, $E_2$, and $E_3$, as well as control outputs $A_1$, $A_2$, $A_3$, $A_4$, and $A_5$. The control outputs $A_1$, $A_2$, $A_3$, $A_4$, and $A_5$ are connected to the control inputs $S_1$, $S_2$, $S_3$, $S_4$, and $S_5$ of the GaAs switch 9 through connection lines 24.

The control inputs $E_1$, $E_2$, and $E_3$ of the decoder 10 are connected to the control line 5.

An example of the decoding of a logical signal applied to one of the inputs $E_1$, $E_2$, and $E_3$ of the decoder 10 into signals applied to the control inputs $S_1$, $S_2$, $S_3$, $S_4$, and $S_5$ of the GaAs switch 9 that are suitable for controlling the GaAs switch is described by the following translation table:

TABLE 1

Logical states of the control inputs $S_1$, $S_2$, $S_3$, $S_4$, and $S_5$ as a factor of the logical states at the control inputs $E_1$, $E_2$, and $E_3$. 1 signifies "high" and 0 signifies "low."

| $E_1$ | $E_2$ | $E_3$ | → | $S_1$ | $S_2$ | $S_3$ | $S_4$ | $S_5$ |
|---|---|---|---|---|---|---|---|---|
| 0 | 0 | 0 |   | 1 | 0 | 0 | 0 | 0 |
| 0 | 0 | 1 |   | 0 | 1 | 0 | 0 | 0 |
| 0 | 1 | 0 |   | 0 | 0 | 1 | 0 | 0 |
| 0 | 1 | 1 |   | 0 | 0 | 0 | 1 | 0 |
| 1 | 0 | 0 |   | 0 | 0 | 0 | 0 | 1 |

In this case, the transmitter inputs $TX_1$, $TX_2$ correspond to the signal inputs from FIG. 1. The receiver inputs $RX_1$, $RX_2$, and $RX_3$ correspond to the signal outputs 3 from FIG. 1.

Figure 3:
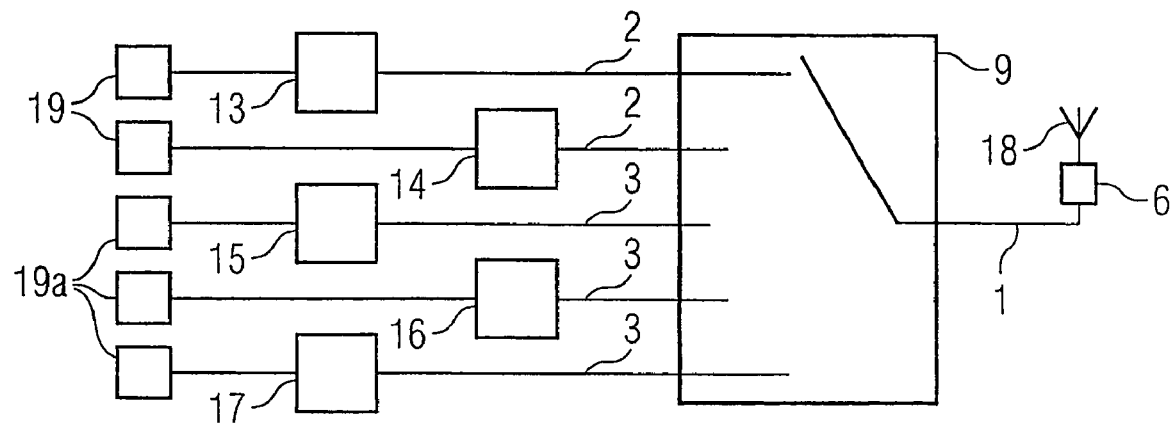
FIG. 3 shows, in a basic circuit diagram, the use of the circuit array in a mobile telephone.

FIG. 3 depicts a circuit module with a GaAs switch 9, which has an antenna input 1 as well as two signal inputs 2 and three signal outputs 3. In addition, the circuit module has two low-pass filters 13, 14, wherein the low-pass filter 13 can be configured for the GSM frequency band and the low-pass filter 14 for the PCN/PCS frequency band. The GaAs switch 9 optionally connects one of the inputs/outputs 2, 3 with its antenna input 1. The circuit module also has band-pass filters 15, 16, 17, which are connected to the signal outputs 3. The band-pass filter 15 is adjusted to the GSM frequency, the band-pass filter 16 to the PCN frequency, and the band-pass filter 17 to the PCS frequency.

The band-pass filter 15, 16, 17 at the signal output 3 can be designed to be less demanding in terms of its specifications, because a portion of filtration is assumed by the ESD protective device. This improves insertion loss on the whole.

The signal inputs 2 of the GaAs switch 9 are electrically connected in transmitter amplifiers 19. The transmitter amplifiers 19, like the low-pass filters 13, 14, are adjusted to radio frequencies GSM and PCN/PCS, respectively. The signal outputs are electrically connected to receiver amplifiers 19a through the band-pass filters 15, 16, 17, wherein the receiver amplifiers 19a are adjusted to the frequency bands GSM, PCN and PCS, respectively. The antenna input 1 of the GaAs switch 9 is connected to an antenna 18. The signals received by the antenna 18 can now be fed, by the GaAs switch 9, into the band-pass filter 16, the band-pass filter 17 or the band-pass filter 18, where they are filtered according to the radio frequency used and further processed in amplifiers 19a. The signals supplied by the transmitter amplifiers 19 are filtered by the low-pass filters 13, 14 and optionally supplied to the antenna 18 for transmission of a signal.

Figure 4:
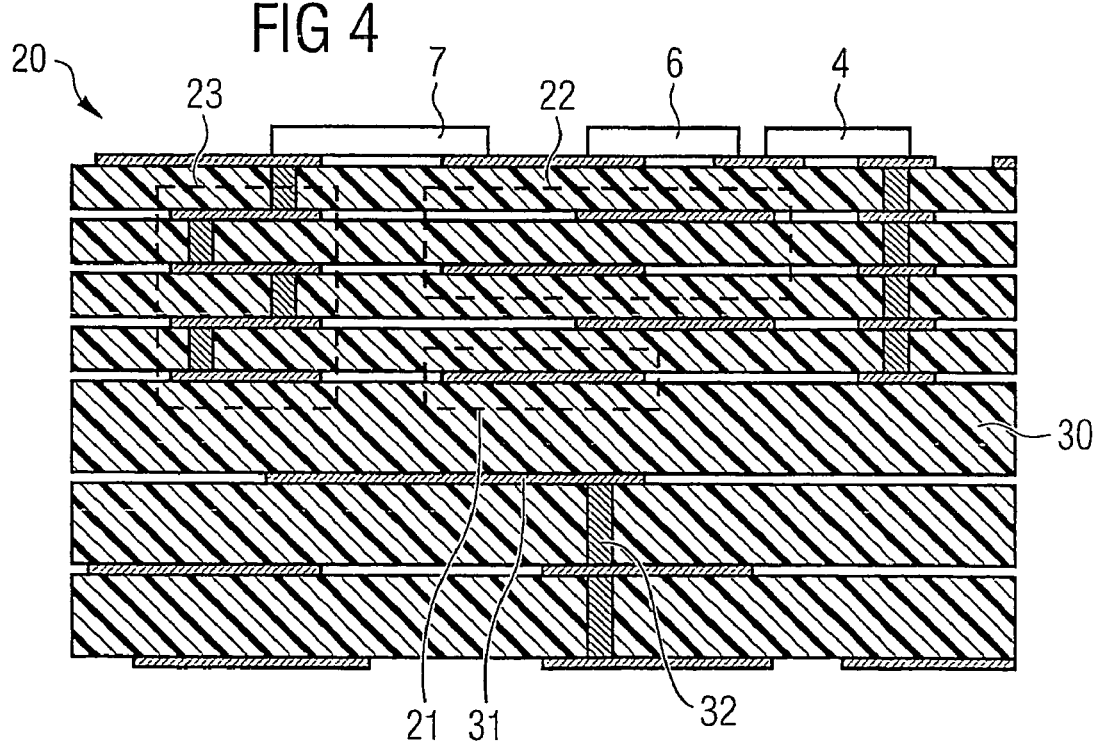
FIG. 4 shows, as an example, the circuit module in a schematic longitudinal section.

FIG. 4 shows a circuit module with a multilayer ceramic substrate 20, into which passive components 21, 22, 23 are integrated. These passive components 21, 22, 23 can be resistors, capacitors 22, and inductors 23, for example. The multilayer ceramic substrate 20 can be designed in a known manner. Stacked ceramic layers 30 separated by metallic layers 31 can be used as the multilayer ceramic substrate 20. A few of the metallic layers 31 are connected to one another through continuous contacts 32 running inside the ceramic layers 30. A switch unit 4, which, for example, can be a gallium-arsenide multiple switch assembled in flip chip technology, is mounted on the upper side of the ceramic substrate 20.

The switch unit 4 can, for example, be secured and electrically contacted by gluing and additional wire-bonding. A GaAs multiple switch may be used as the switch unit 4. This type of switch can have an insertion loss of 0.8 dB in the frequency range between 1 and 2 GHz. It can be an integrated circuit with FET produced on a gallium-arsenide base, with its pin surface connected to the ceramic substrate 20 by soldering.

The switch unit 4 can also be attached to the multilayer ceramic substrate 20 and electrically bonded by wire bonding. Bonding by soldering may be used when the switch unit 4 is to be used with an additional housing.

The passive components 21, 22, 23 can form the filters 13, 14, 15, 16, 17 required in accordance with FIG. 3.

In addition, the switch unit 4, the first protective device 6 and the second protective device 7 are also mounted onto the surface of the substrate 20. This accomplishes a high degree of integration for the circuit module, which advantageously affects the space requirements of the circuit module.

The individual components of the first protective device 6 can be arranged on the upper side of the ceramic substrate 20. However, individual components, such as the capacitors C1, C2, C3, can also be integrated into the ceramic substrate 20, like the passive components 21, 22, 23.

The claims are not limited to the examples of the second and third protective device monitored above. In addition, the circuit array or the circuit module is not limited to applications in mobile telephones.

The invention claimed is:

1. A circuit array comprising:
   a first antenna input;
   a signal input;
   a signal output;
   a switch unit to selectively electrically connect the antenna input to either the signal input or the signal output; and
   a first protective device electrically connected to the antenna input, the first protective device comprising a band-pass filter in a π configuration, the band-pass filter for suppressing frequencies below a first frequency and for suppressing frequencies above a second frequency.

2. The circuit array of claim 1, wherein the band-pass filter has an attenuation that is less than 0.5 dB in a frequency range between 1 and 2 GHz and, and an attenuation greater then 20 dB in a frequency range greater than 3.4 GHz.

3. The circuit array of claim 1, further comprising:
   a control line for controlling the switch unit, the control line being electrically connected to a second protective device.

4. The circuit array of claim 3, wherein the first and second protective devices are electrically connected to a ground.

5. The circuit array of claim 3, wherein the second protective device comprises a voltage-limiting element.

6. The circuit array of claim 5, wherein the voltage-limiting element comprises at least one of a varistor, a spark gap, and a Zener diode.

7. The circuit array of claim 6, wherein the varistor has a switching voltage of less than 6 V.

8. The circuit array of claim 1, wherein the switch unit comprises a voltage-controlled switch.

9. The circuit array of claim 8, wherein the switch unit comprises a gallium-arsenide switch.

10. The circuit array of claim 1, further comprising:
a decoder having a supply line, the supply line being electrically connected to a second protective device.

11. The circuit array of claim 1, further comprising:
frequency filters in series with at least one of the signal input and the signal output.

12. The circuit array of claim 1, wherein the first antenna input is electrically connected to an antenna, the signal input is electrically connected to a transmission amplifier, and the signal output is electrically connected to a reception amplifier.

13. The circuit array of claim 1, wherein the first protective device is at least partly constructed on transmission lines that are coupled together.

14. The circuit array of claim 1, wherein the first protective device protects against electrostatic discharge.

15. A circuit array comprising:
a first antenna input;
a signal input;
a signal output;
a switch unit to selectively electrically connect the antenna input to either the signal input or the signal output; and
a first protective device electrically connected to the antenna input, the first protective device comprising a band-pass filter in a π configuration;
wherein the first protective device comprises a second antenna input and a switch unit output, the second antenna input being connected to the switch unit output via a conductor; and
wherein the circuit array further comprises:
a series circuit comprising a first capacitor and a first inductor in series with the conductor;
a first parallel circuit between the antenna input and the series circuit, the first parallel circuit comprising a second capacitor and a second inductor in parallel with the conductor and electrically connected to a ground; and
a second parallel circuit between the switch unit output and the series circuit, the second parallel circuit comprising a third capacitor and a third inductor in parallel with the conductor and electrically connected to a ground.

16. The circuit array of claim 15, further comprising:
a fourth capacitor in series with the conductor between the switch unit output and the second parallel circuit.

17. The circuit array of claim 16, further comprising:
a fifth capacitor in series with the conductor between the second antenna input and the first parallel circuit.

18. A circuit array comprising:
a first antenna input;
a signal input;
a signal output;
a switch unit to selectively electrically connect the antenna input to either the signal input or the signal output; and
a first protective device electrically connected to the first antenna input, the first protective device comprising a band-pass filter in a π configuration;
wherein the first protective device comprises a second antenna input connected to a switch unit output via a transmission line; and
wherein the circuit array further comprises:
a series circuit comprising a first capacitor and a first inductor in series with the transmission line;
a first parallel circuit between the second antenna input and the series circuit, the first parallel circuit comprising a second capacitor and a second inductor in parallel with the transmission line and electrically connected to a ground; and
a second parallel circuit between the switch output and the series circuit, the second parallel circuit comprising a protective element and a third inductor in parallel with the transmission line and electrically connected to a ground.

19. A circuit array comprising:
a first antenna input;
a signal input;
a signal output;
a switch unit to selectively electrically connect the antenna input to either the signal input or the signal output; and
a first protective device connected to the antenna input, the first protective device comprising a band-pass filter in a π configuration;
wherein the first protective device comprises an antenna input connected to a switch unit output via a transmission line; and
wherein the circuit array further comprises:
a series circuit comprising a first capacitor and a first inductor connected in series with the transmission line;
a first parallel circuit between the antenna input and the series circuit, the first parallel circuit comprising a protective element and a second inductor in parallel with the transmission line and electrically connected to a ground; and
a second parallel circuit between the switch output and the series circuit, the second parallel circuit comprising a second capacitor and a third inductor in parallel with the transmission line and electrically connected to a ground.

20. A circuit module comprising:
a circuit array comprising
an antenna input;
a signal input;
a signal output;
a switch unit to selectively electrically connect the antenna input to either the signal input or the signal output; and
a first protective device connected to the antenna input, the first protective device comprising a band-pass filter in a π configuration, the band-pass filter for suppressing frequencies below a first frequency and for suppressing frequencies above a second frequency; and
a multilayer ceramic substrate that includes integrated passive components that form frequency filters, wherein the switch unit is on an upper side of the ceramic substrate, the ceramic substrate including the first protective device.

21. The circuit module of claim 20, wherein the circuit module is a front-end module in a mobile telephone.

22. A protective device comprising a band-pass filter in a π configuration, the band-pass filter for suppressing frequencies below a first frequency and for suppressing frequencies above a second frequency, the protective device comprising:
  an antenna input;
  a switch output, the antenna input being connected to the switch output via a conductor;
  a series circuit comprising a first capacitor and a first inductor in series with the conductor;
  a first parallel circuit between the antenna input and the series circuit, the first parallel circuit comprising a second capacitor and a second inductor in parallel with the conductor and electrically connected to a ground; and
  a second parallel circuit between the switch output and the series circuit, the second parallel circuit comprising a third capacitor and a third inductor in parallel with the conductor and electrically connected to a ground.

23. The protective device of claim 22, wherein the conductor comprises one or more transmission lines.

24. A protective device comprising:
  an antenna input;
  a switch output, the antenna input being connected to the switch output via a conductor;
  a series circuit comprising a first capacitor and a first inductor in series with the conductor;
  a first parallel circuit between the antenna input and the series circuit, the first parallel circuit comprising a second capacitor and a second inductor in parallel with the conductor and electrically connected to a ground; and
  a second parallel circuit between the switch output and the series circuit, the second parallel circuit comprising a third capacitor and a third inductor in parallel with the conductor and electrically connected to a ground;
  wherein the protective device comprises a band-pass filter in a π configuration; and
  wherein the band-pass filter has an attenuation that is less than 0.5 dB in a frequency range between 1 and 2 GHz and an attenuation greater then 20 dB in a frequency range greater than 3.4 GHz.

25. A circuit array comprising:
  means for selectively electrically connecting an antenna input to a signal input or signal output; and
  means for protecting the circuit array against electrostatic discharge, the means for protecting the circuit array comprising a band-pass filter in a π configuration, the band-pass filter for suppressing frequencies below a first frequency and for suppressing frequencies above a second frequency.

* * * * *

UNITED STATES PATENT AND TRADEMARK OFFICE
CERTIFICATE OF CORRECTION

| | |
|---|---|
| PATENT NO. | : 7,343,137 B2 |
| APPLICATION NO. | : 10/490930 |
| DATED | : March 11, 2008 |
| INVENTOR(S) | : Christian Block et al. |

It is certified that error appears in the above-identified patent and that said Letters Patent is hereby corrected as shown below:

Cover Page, Title:

Delete "CIRCUIT SWITCHING MODULE COMPRISING THE SAME, AND USE OF SAID SWITCHING MODULE" and Insert -- ELECTROSTATIC DISCHARGE PROTECTION DEVICE WITH PI CONFIGURATION --

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO.         : 7,343,137 B2                                       Page 1 of 1
APPLICATION NO. : 10/490930
DATED              : March 11, 2008
INVENTOR(S)        : Christian Block et al.

It is certified that error appears in the above-identified patent and that said Letters Patent is hereby corrected as shown below:

Cover Page, and Column 1, lines 1 and 2, Title:

Delete "CIRCUIT SWITCHING MODULE COMPRISING THE SAME, AND USE OF SAID SWITCHING MODULE" and Insert -- ELECTROSTATIC DISCHARGE PROTECTION DEVICE WITH PI CONFIGURATION --

This certificate supersedes the Certificate of Correction issued August 12, 2008.

Signed and Sealed this

Sixteenth Day of September, 2008

JON W. DUDAS
*Director of the United States Patent and Trademark Office*